(No Model.)  2 Sheets—Sheet 1.

D. B. MERRELL.
MANURE SPREADER.

No. 448,884.  Patented Mar. 24, 1891.

Witnesses
A. F. Walz
Mark W. Dewey

Inventor
Daniel B. Merrell
By his Attorneys
Drull, Laass & Drull (No Model.) 2 Sheets—Sheet 2.
D. B. MERRELL.
MANURE SPREADER.
No. 448,884. Patented Mar. 24, 1891.
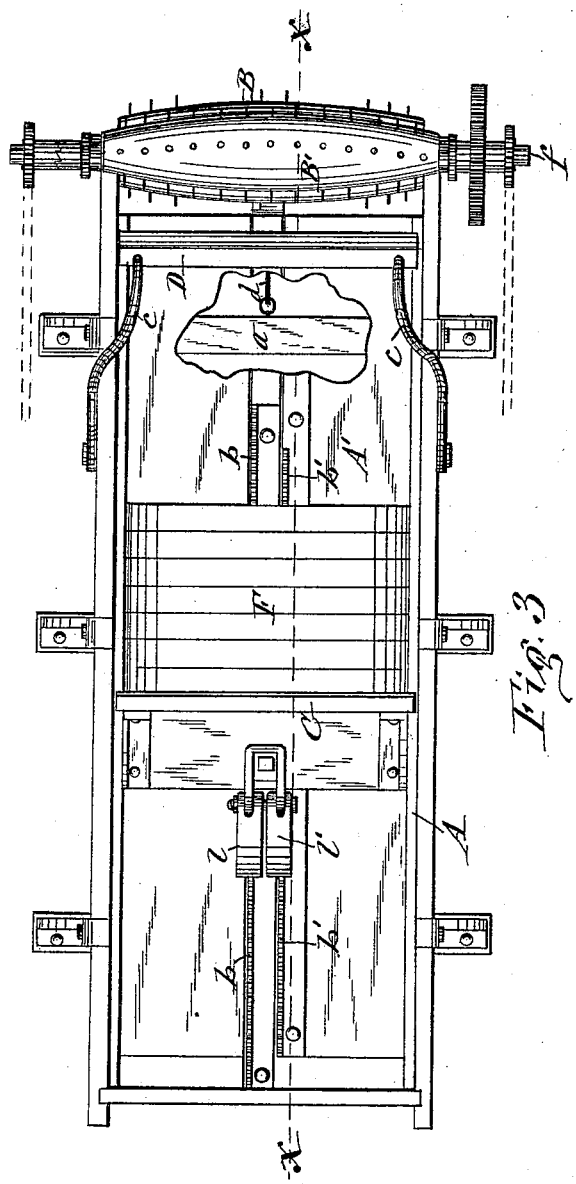
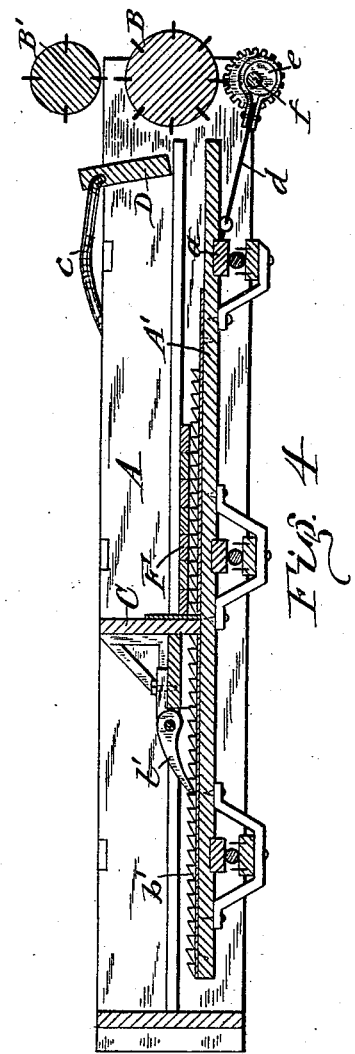
Witnesses
A. F. Walz,
Mark W. Dewey
Inventor
Daniel B. Merrell
By his Attorneys
Duell, Laass & Duell

UNITED STATES PATENT OFFICE.

DANIEL B. MERRELL, OF CANANDAIGUA, NEW YORK.

MANURE-SPREADER.

SPECIFICATION forming part of Letters Patent No. 448,884, dated March 24, 1891.

Application filed October 30, 1890. Serial No. 369,768. (No model.)

*To all whom it may concern:*

Be it known that I, DANIEL B. MERRELL, of Canandaigua, in the county of Ontario, in the State of New York, have invented new and useful Improvements in Manure-Spreaders, of which the following, taken in connection with the accompanying drawings, is a full, clear, and exact description.

This invention relates to the class of manure-spreaders which have a beater or distributer connected to the rear end of the vehicle-body containing the manure, and a conveyer in said body and movable lengthwise thereof to carry the manure to the beater or distributer, by which it is cast from the rear end of the vehicle and spread upon the ground.

The invention consists, first, in the combination, with the vehicle-body, conveyer, and distributer or beater, of a breast in front of the distributer to pack the manure preparatory to being acted upon by the distributer, which is thereby enabled to obtain a more effective hold upon the manure and distribute the same more evenly and effectually.

The invention consists, secondly, in an improved form of the beater, which is tapered longitudinally from the center to opposite ends, and is thereby rendered more efficient in its operation.

The invention furthermore consists in the combination, with the conveyer or movable end-board, of a false floor-section attached to and moving with said conveyer or end-board, which arrangement facilitates the moving of the manure toward the distributer or beater, all as hereinafter more fully described, and set forth in the claims.

Figure 1:
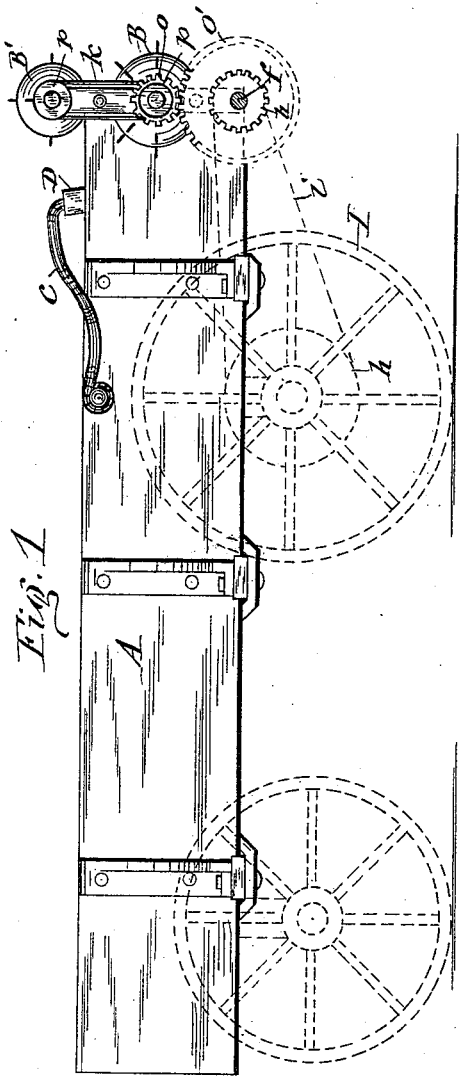
Figure 2:
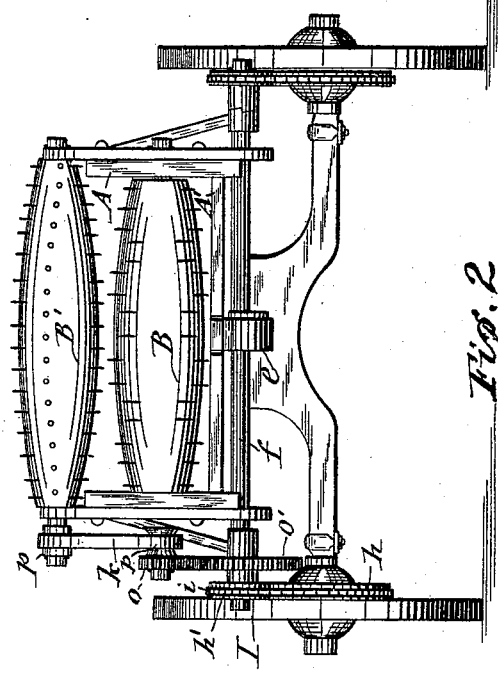

In the annexed drawings, Figure 1 is a side view of that portion of a manure-spreader to which my improvements are applied. Fig. 2 is a rear end view of the same. Fig. 3 is a plan view, a portion of the floor of the wagon-body being broken away to show the connection of the same with the eccentric rod or pitman, which transmits motion to said floor; and Fig. 4 is a longitudinal vertical section on line $xx$, Fig. 3.

Similar letters of reference indicate corresponding parts.

A represents the wagon-body, in which is carried the manure to be spread.

B B' denote the rotary distributers, usually termed "beaters," which extend across the rear end of the wagon-body and are pivoted to suitable supports on said body, and C denotes the conveyer or movable end-board, which is extended across the interior of the body and usually consists of a board placed vertically edgewise and movable lengthwise of the body.

My present invention is not limited to any specific means for imparting to the beaters and movable end-board or conveyer their requisite motions.

For a more exemplification of the means for transmitting motion to the aforesaid parts I have shown the same in the annexed drawings in the form similar to that shown in my patent, No. 419,463, dated January 14, 1890, and which I will now describe only briefly, inasmuch as the same is susceptible of many modifications. The floor A' of the body A is divided longitudinally and supported movably longitudinally on the body. Between the two sections of said floor is a ratchet-bar $b$, extending lengthwise of the body and rigidly secured in its position. Another ratchet-bar $b'$, is attached to the top of one of the movable floor-sections A', preferably at the edge adjacent to the aforesaid stationary ratchet-bar and of about the same length. Horizontally across the rear end of the body and beneath the same is pivoted a shaft $f$, to which is affixed either a crank or an eccentric $e$, as shown in Fig. 4 of the drawings. A pitman or eccentric rod $d$ connects said crank or eccentric to a cross-bar $a$, attached to the under side of the two movable floor-sections A' A', and thus the latter receives a reciprocating motion from the shaft $f$ when in motion. This shaft receives rotary motion from one of the traction-wheels I by means of sprocket-wheels $h$ $h'$, attached, respectively, to said shaft and traction-wheel, and a sprocket-chain $i$, running on said sprocket-wheels. To the front of the conveyer or end-board C are pivoted two pawls $l$ $l'$, engaging, respectively, the two ratchet-bars $b$ $b'$. The ratchet-bar $b'$ being reciprocated by the floor-section A', to which it is attached, pushes along the conveyer C, and the engagement of the pawl $l$ with the stationary ratchet-bar $b$ retains the conveyer in its position during the reverse movement of the reciprocating bar $b'$. In this manner the conveyer C is intermittently moved toward the distributer or beaters B B' and caused to push the manure to the latter.

In order to facilitate this operation of the conveyer C, I attach to the base thereof a rearwardly-extending false floor-section F, which is arranged movable with the said conveyer or end-board and supports the manure directly in the rear of the same. The two beaters B B' are connected by an endless belt $k$, running on pulleys $p$ $p$, attached to the shfts of the beaters, as shown in Fig. 1 of the drawings, and a pinion $o$ on the shaft of the lower beater B meshes with a gear $o'$ on the shaft $f$, hereinbefore referred to. This shaft has also attached to it the small sprocket-wheel $h'$, which by an endless chain $i$ is connected with and receives motion from the sprocket-wheel $h$, attached to one of the traction-wheels I.

The most important feature of my present invention consists in the arrangement of the breast D, which extends across the interior of the body between the conveyer C and lower beater or distributer B, and preferably immediately in front of the latter. The purpose of this breast is to pack the manure in transit to the beater or distributer B, so as to allow the latter to obtain a more effective hold upon the manure, and thus distribute the same more thoroughly upon the ground.

The beater B usually consists of a roller armed with radially-projecting teeth or spikes, and in some machines two such beaters are arranged axially parallel one above the other, as shown in Fig. 2 of the drawings, while in other machines of this class only one beater is employed. Its function is, as already stated, to cast the manure from the vehicle and disperse it upon the ground; but in practice it has been found that the manure, especially when it contains sawdust or wood-turning chips, is brought to the beater or distributer B in such a loose condition that the latter is unable to obtain a proper hold upon the manure for effectually spreading the same upon the ground. This defect is entirely obviated by the employment of the breast D, which packs the manure forced against said breast by the conveyer C preparatory to being acted on by the beater or distributer. Said breast may be of any suitable form and material. The simplest form is a board or plank set vertically edgewise and somewhat inclined with its bottom rearward or toward the beater, as illustrated in Fig. 1 of the drawings. It is to be arranged movable vertically to allow the manure to pass on to the beater after the manure has been packed to the proper degree, and, if desired, it may be arranged to be moved at will by the person in charge of the machine; but I prefer to arrange it to move automatically, and for that purpose I connect the breast D to arms $c$ $c$, extending forward therefrom and pivoted to a suitable part of the body A, preferably to the sides thereof, as shown. When thus arranged, the inclined breast D is wedged upward and lifted by the manure pressed against it by the conveyer C, but presents sufficient resistance to pack the manure to the requisite degree. This breast may be employed in connection with a beater or distributer of any form adapted to disperse the manure from the body A.

My second improvement pertains to the form of the beater B, the body of which has hitherto been made cylindrical or straight longitudinally, and in consequence thereof said beater cast all the manure straight from the end of the vehicle and in lines parallel with the body A, and thus covered only a strip of ground slightly wider than the vehicle-body. This defect I obviate by forming the beater B tapering from the center to opposite ends thereof, as illustrated in the annexed drawings. The beater is thus provided with two operating-faces, which are disposed at angles from the center toward opposite sides of the track of the vehicle, and consequently cast the manure over a wider track on the ground.

Having described my invention, what I claim as new, and desire to secure by Letters Patent, is—

1. The combination, with the vehicle-body, distributer, and conveyer in said body and movable toward said distributer, of a breast in front of the latter to pack the manure preparatory to being acted upon by the distributer, as set forth.

2. In combination with the vehicle-body, distributer connected to the end of said body and conveyer in the body and movable toward the distributer, and a breast in front of the latter and sustained movably vertically, as set forth.

3. In combination with the vehicle-body, distributer connected to the end of said body and conveyer in the body and movable toward the distributer, arms pivoted to the sides of the body, and a breast connected to said arms and extending across the interior of the body in front of the distributer, substantially as described and shown.

4. In a manure-spreader, the combination, with the vehicle-body, of a beater extending across the rear end of the body and tapered longitudinally from the center to opposite ends, as set forth and shown.

5. In a manure-spreader, the combination, with the vehicle-body and reciprocating floor A', of the end-board arranged movably upon said floor, and the false floor-section F, attached to and extending rearward from said end-board, substantially as described and shown.

In testimony whereof I have hereunto signed my name this 1st day of October, 1890.

DANIEL B. MERRELL. [L. S.]

Witnesses:
C. A. CARMICHAEL,
L. N. GRAVES.